United States Patent Office 3,434,412
Patented Mar. 25, 1969

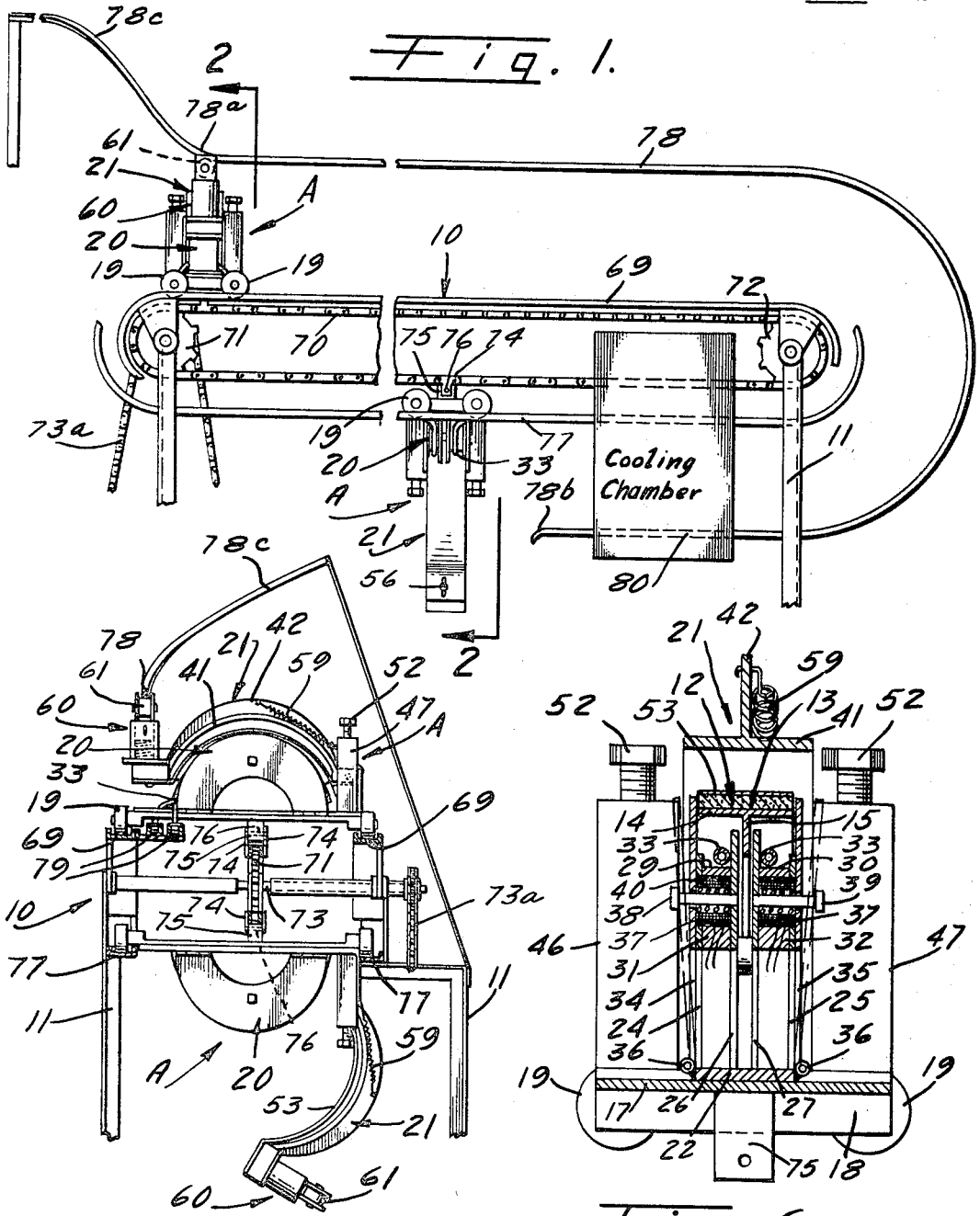

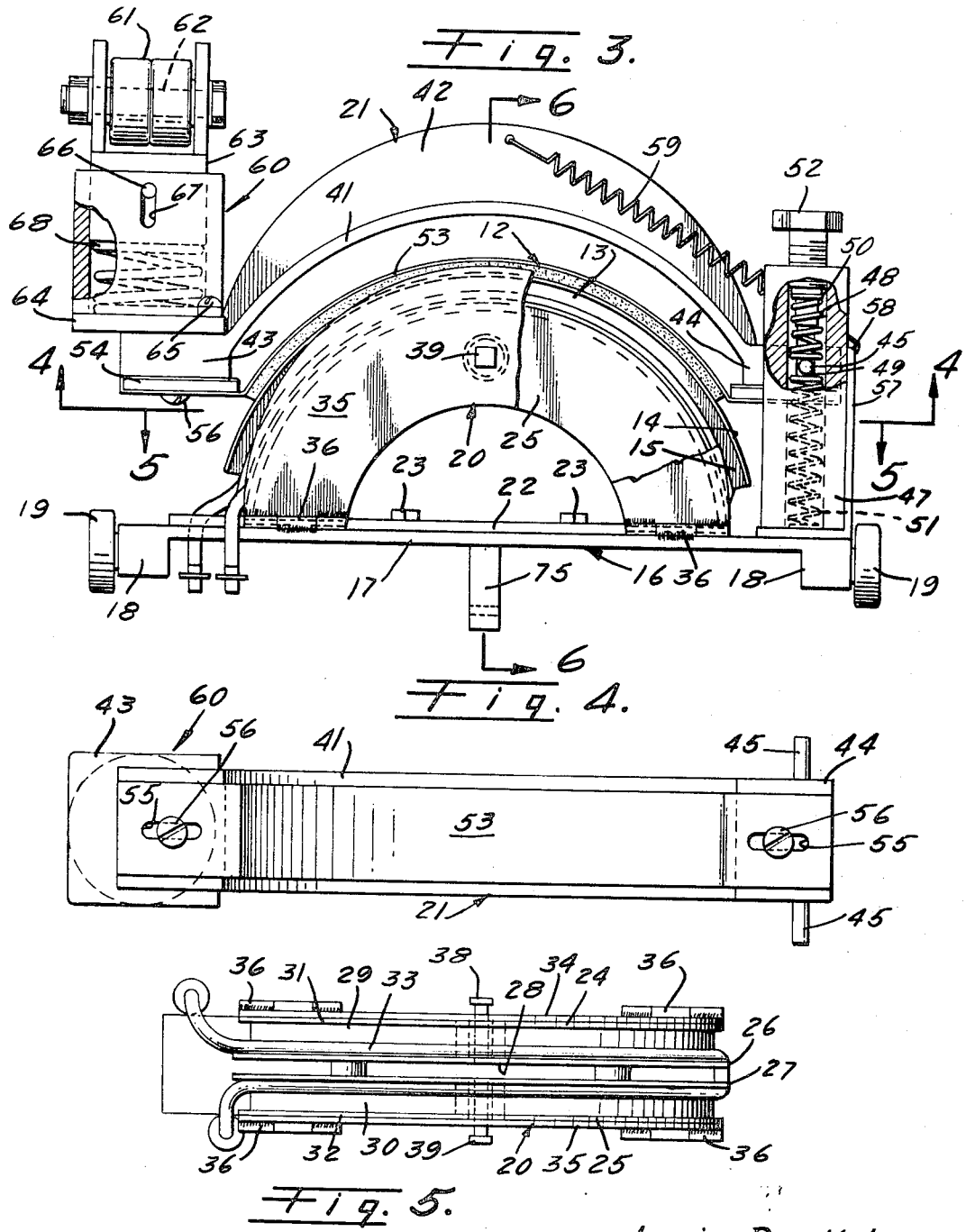

3,434,412
APPARATUS FOR BONDING A BRAKE LINING
TO A BRAKE SHOE
Louis B. Katz, 855 6th St., Santa Monica, Calif. 90403
Filed Sept. 28, 1965, Ser. No. 490,842
Int. Cl. B30b 15/34
U.S. Cl. 100—93                    11 Claims

ABSTRACT OF THE DISCLOSURE

Apparatus for securing brake lining pads to a break shoe in which the brake shoe is supported on one clamping member and the lining pad is pressed against the shoe by a cooperative hinged rigid clamp member having a flexible pressure applying band, the lining pad being alignable on the shoe by movable side members activated by an electro-magnet positioned between the side members. For high speed production the clamping members are transported as units successively through a first station in which a cam closes the clamping members for pressing the lining against the shoe, a second station in which the lining is bonded to the shoe by heating, a third cooling station, and a discharge station in which the clamping members are opened and the shoe with the lining affixed thereto are discharged by gravity.

---

The present invention relates generally to apparatus for securing a brake lining pad to a brake shoe; and is more particularly concerned with apparatus for the bonding of brake lining pads to brake shoes, such as utilized in braking units for automobiles and the like, and which can be operated on a high speed production basis.

Heretofore, in following conventional procedures, a pair of arcuate brake shoes such as embodied in prevailing brake assemblies had to be manually positioned and mounted in opposed relation. Brake lining pads with a temperature activated bonding medium on their inner surfce had to then be manually positioned on the respective shoes and clamped by means of a band tightened around them so as to hold them in place. As thus assembled, the brake shoes with the lining pads thus clamped in position were then placed in an oven and heated to a sufficiently high temperature to activate the bonding medium, this temperature usually being of the order of approximately 550° F. Afterwards, the assembled parts had to be removed from the oven, and only after a cooling interval could they be disassembled and the brake shoes with the pads bonded thereto removed.

The above described procedure is inherently extremely unsatisfactory not only from an economical consideration, but also for the reason that the results varied greatly and were undependable. Skilled labor was required in order to properly assemble the lining pads on the brake shoes, and subsequently disassemble them after removal from the heating oven.

The main objection, however, to the conventional procedures results from the necessity of having to heat the material of the lining pad to the high temperature required for activating the bonding medium. This high temperature has a deteriorating effect on the pad material and reduces its effective life.

With the foregoing in mind, it is one object of the present invention to provide apparatus wherein provision is made for locally applying or generating the heat energy required for activating the bonding material so as not to unduly heat the material of the pad to a point which would be deleterious. One way in which this can be accomplished is to apply or generate heat energy directly in or adjacent to the brake shoe, such as by the use of electric induction heating means, an electric heating element, a gas flame or other means which can be utilized in a manner to concentrate the heat source adjacent to the lining pad surface containing the bonding medium, whereby the bonding medium can be activated without subjecting the entire material of the lining pad to the high temperature required for the bonding operation.

A further object of the invention is to provide an improved clamping fixture or device for holding and positioning the brake shoe, and for properly locating, aligning and holding the brake lining pad thereon during the bonding operation.

Another object is to provide a clamping fixture or device in which the brake shoe and the brake lining which is to be bonded thereto can be quickly positioned, and after the bonding operation quickly removed without the necessity of employing skilled labor.

Still another object is to provide apparatus for the herein described purpose which can be operated on a production basis by unskilled persons, and wherein the critical parts of the operating procedure will be automatically accomplished.

It is also an object of the herein described invention to provide apparatus wherein a lining pad once having been assembled on a brake shoe surface to which it is to be bonded, will thereafter be automatically carried through a series of successive operative stations, and finally the brake shoe with the lining pad bonded thereto delivered to a point of collection.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a fragmentary side elevational view of apparatus embodying the herein described invention;

FIG. 2 is an enlarged fragmentary transverse sectional view of the same, taken substantially on line 2—2 of FIG. 1;

FIG. 3 is an enlarged elevational view of the device as used in the apparatus for holding and transporting the brake shoes and liner pads to be bonded thereto through the various operative stations;

FIG. 4 is a face view of the upper clamping element of the device as viewed along the line 4—4 of FIG. 3.

FIG. 5 is a face view of the lower clamping element of the device, as viewed from line 5—5 of FIG. 3; and FIG. 6 is a vertical transverse sectional view through the device, with the clamping elements in closed position, and taken substantially on line 6—6 of FIG. 3.

Referring more specifically to the drawings, for illustrative purposes, the apparatus of the present invention is disclosed in FIG. 1 as comprising an elongate frame structure 10 which is supported in an elevated position by a plurality of depending supporting legs 11, and which is arranged to provide a plurality of operative stations through which one or more transporting devices A may be carried to effect a bonding securement of a brake lining pad 12 to the outer arcuate surface of a brake shoe 13, as shown in FIG. 3. Brake shoes of conventional type, as discussed herein, are constructed so as to have an arcuate peripheral flange 14 which forms the brake shoe and has an outwardly exposed surface to which the brake lining pad 12 is bonded by means of a bonding medium which is normally applied to the inner surface of the paid so that it will be interposed between the pad and the outer surface of the brake shoe flange, and upon being heated to the required activating temperature will bond the pad to the brake shoe. The brake shoe is further constructed with a radially extending mounting flange 15 which is integrally formed with the flange 14 and positioned intermediate the lateral edges of the flange 14.

As best shown in FIGS. 3 to 6, the transporting device A comprises an elongate base structure 16 of substantially rectangular configuration. This base structure may be variously constructed, but for illustrative purposes is herein shown as being fabricated with a plate member 17 which is provided at its ends with transversely extending thickened portions 18 which serve as mounting members for wheels 19 at the respective ends, these wheels projecting above and below the upper and lower limits of the frame structure. As thus arranged the frame structure provides a wheeled carriage which supports the transporting device for lateral movements in the apparatus, as will hereinafter be explained.

The base structure 16 provides a mounting for a pair of operatively associated lower clamping means as generally indicated by the numeral 20, and upper clamping means as generally indicated by the numeral 21.

The lower clamping means comprises a unitary structure having a base plate 22 which is removably connectible as by holding bolts 23 to the base structure 16 so as to mount the lower clamping means rigidly on the wheeled carriage. The base plate 22 extends along the upper surface of the plate member 17 and has arcuate side plates 24 and 25 which are welded at their ends to the base plate 22 so as to form upstanding spaced apart supports between which there is provided a supporting structure for holding and positioning the brake shoe upon which the lining paid is to be secured. For such purpose, a pair of spaced apart arcuate disc members 26 and 27 is secured so as to form a slot or opening 28 for receiving edgewise therein the mounting flange 15 of the brake shoe and hold it in a position with the flange portion 14 thereof elevated above underlying arcuate surfaces 29 and 30 of arcuate spacer members 31 and 32 respectively, which are placed between the side plates and the inner disc members. A more or less closed chamber is thus provided on each side of the mounting flange 15 in proximity to the flange 14 of the brake shoe, and by placing a heating element 33, in this case an electrically energizable heating element, in the heating chambers, the heat energy can be applied directly to the adjacent brake shoe structure and thus apply heat directly to the bonding medium on the adjacent surfaces of the lining pads which are to be secured thereto. However the brake shoe structure also provides a shield between the source of heat energy and the lining pad, and the outer surface of the lining pad is cooled by the associated upper clamping means and ambient radiation which will keep the material of the pad lining below a deleterious temperature. While an electrically energizable heating element has been illustrated, the invention envisions in its broad aspects the use of any othe conventional heat generating means such as gas, induction heating of the brake shoe and the like.

Outwardly of the side plates 24 and 25 there are provided arcuate plates 34 and 35 which are connected at their ends by hinges 36—36 for lateral swinging movement. Peripheral portions of these plates extend beyond the flange 14 of an inserted brake shoe and are adapted, when swung towards the brake shoe to engage and align thereon the lining pads which are to be bonded to the brake shoe. The actuation of the hinge plates 34 and 35 into engagement with the lining pads is accomplished electromagnetically by means of energizable coils 37–37 (FIG. 6) which upon being energized create a magnetic flux which will attract the plates towards each other and into engagement with the sides of the lining pads. Outward movement of the plates is limited by headed stop members 38 and 39 having shank portions which extend axially of the associated magnetizable coils. A compression spring 40 placed within each of the magnetizing coils acts against the associated hinged plate to move it away from the lining pad edge when the coil is deenergized. Thus, releasable holding means are provided for aligning and holding the lining pad in proper position during the bonding operation, yet may be released when desired to permit removal of the brake shoe with the lining pad bondingly secured to it, whenever desired.

The upper clamping means is mounted for swinging movement into clamped and unclamped relation with the lower clamping means, and in the unclamped position permits placement of the brake shoe and the lining pad into the lower clamping means in proper position for bonding, and also permits removal of the brake shoe with the bonded pad thereon. The upper clamping means comprises a rigid molded or otherwise formed arcuate frame structure 41 having a central reenforcing rib 42 and terminating at its ends in projecting flat end portions as indicated at 43 at the forward end and 44 at the rear end of the frame structure. The frame structure 41 is hinged for swinging movement about a hinge pin 45 carried by the rear end portion 44, the opposite ends of this pin projecting on opposite sides of the end portion and forming supporting trunnions which extend outwardly on each side of this end of the frame structure. The opposite ends of the pin 45 are associated with spaced apart fixed posts 46 and 47 which are welded or otherwise rigidly secured at their lowermost ends to the rear end of the wheeled carriage. The posts are each formed with a longitudinally extending axial bore 48 which communicates at the inner side of the post with a side slot 49 which is adapted to receive the adjacent hinge pin end therethrough so that the pin end extends into the bore 48. Upper and lower compression springs 50 and 51 are retained in the bore 48 with their adjacent ends in engagement with the pin end therein. The uppermost end of the bore 48 is threaded to receive a screw member 52 which is adjustable to vary the position of the hinge mounting of the upper clamping means and adjust the resiliently applied pressure which is to be exerted against the lower clamping means during a bonding operation.

As shown in FIG. 3, it will be seen that the frame structure 41 does not directly engage the lining pad which is to be bonded to the brake shoe held by the lower clamping means. Instead, a flexible band 53 is mounted so as to extend between the end portions 43 and 44. Each end of the band 53 is adjustably connected by passing the end portion of the band around a mounting plate 54, the band and plate being slotted as shown at 55 to receive a securing screw 56 therethrough. Thus the band may be adjusted for different sizes of brake shoes. This construction permits the pad engaging portions of the band to freely accommodate to the pad when the upper and lower clamping means are in clamped relation.

Opening swinging movement of the upper clamping means is limited by providing a plate member 57 which extends between the posts 46 and 47, the upper endge 58 of the plate being positioned so that it will be engaged by the rear end portion of the frame structure 41 when it is swung to its fully opened position. A tension spring 59 having one end connected to the edge portion 58 of the plate 57 and its other end connected to the reenforcing rib 42 acts to normally balance the weight of the upper clamping means and retain it in its unclamped position in engagement with the edge 58.

The forward end portion 43 of the frame structure 41 is provided with cam engaging means 60 for a purpose which will be subsequently explained. The cam engaging means comprises a roller 61 which is rotatably supported upon a shaft forming member 62 at the uppermost end of a support 63 having axial sliding movement with a relatively fixed upstanding bracket 64 secured to the end portion 43 as by holding screws as indicated at 65. The support 63 is limited in its movement by a pin 66 thereon which projects into a slot 67 of the bracket and is movable longitudinally thereof. The support 63 is normally urged to its upper limit by means of a compression spring 68. With this arrangement, an associated camming member can be arranged so as to move the roller 61 downwardly against the force of the spring 68, when the upper clamping means are in clamping position, whereby to resiliently retain with the aid of the spring supported hinge structure and resiliently forcefully maintain the flexible band 53 in a forcefully urged position for retaining the lining pads against the brake shoe surface to which the pads are to be bonded.

Referring again to FIG. 1, the incorporation of the transporting device A into production apparatus for automatically carrying out the bonding operation, will now be described. For such purpose, the carriage of the transporting device is guidingly moved along upper guide tracks 69–69, these guide tracks being in the form of channels which are so spaced as to properly guidingly receive therein the carriage wheels 19—19. Power means is provided for moving the transport device, wherein a link chain 70 is trained over a driving sprocket 71 and idler sprocket 72 which are rotatably supported on the frame structure 10. The driving sprocket 71 is shown as being mounted on a rotatable drive shaft 73 which may be driven from a suitable power source such as an electric motor through a drive chain such as shown at 73a. The link chain 70 has a driving connection with each of the transport devices of the apparatus through T-shaped links 74–74 having pivotal connection with a depending bracket 75 fixedly secured to the plate member 17, a pivot pin 76 extending through the T-links and the bracket so as to permit relative pivotal movement when the transport devices are carried around the ends of the apparatus from a first path of movement in which the transporting device A is in an upright position to a second path of movement in which the transporting device A is in an inverted position with its wheels 19—19 suspending it from lower guide tracks 77–77. The transporting devices are thus successively carried through successive operative stations in a path of movement which includes the first path section in which the transporting device is in an upright position and the second path section in which the transporting device is in an inverted position.

Assuming now that it is desired to bond a lining pad onto a brake shoe which has been placed in the lower clamping means 20, and that the upper clamping means 21 has been moved into a holding position, the movement of the transporting device is arranged at the beginning of the first path section to close an energizing circuit to the magnetizing coils 36 and 37 which will motivate the hinged plates 34 and 35 towards each other and into positions which will engage the lining pad and align it with respect to the associated brake shoe. The energization of these coils may be accomplished in any conventional manner and at any appropriate time after the insertion of the brake shoe and associated lining into the transporting device.

After the lining pad is aligned, movement of the transporting device will carry it to a position wherein the roller 61 will be brought into engagement with a camming track 78 at a point, for example, as indicated at 78a wherein the roller support will be depressed against the spring 68 and thus resiliently provide a pressure clamping of the lining pad against the brake shoe.

After this clamping operation, the transporting device will then be carried to a position wherein the respective end terminals of the heating element 33 will be connected through appropriate slide contacts with circuit conductors 79 which will energize the heating element and heat up the adjacent parts of the brake shoe to a sufficient temperature to activate the bonding medium between the lining pad and brake shoe. The heating process may be carried out for each of the transporting devices at any desired time while it is traveling through the first path section. Termination of the heating process is accomplished by discontinuing the energizing conductors so that they will not be engaged by the contacts of the heating element.

It will be noted that the camming track 78 is continued around the right end of the apparatus as viewed in FIG. 1 so that the upper and lower clamping means of the transporting device will be maintained during the transition of the transporting device from its upright position in the first path section to an inverted position in the second path section. As the transporting device enters the second path section, it is carried through a cooling chamber 80 which may be of conventional construction and arranged to expedite the cooling of the brake shoe with the lining pad bonded thereto. Upon emerging from the cooling chamber, the transporting device will reach a position in which the roller 61 will be disengaged from the camming track 78, for example as indicated at the point 78b. As soon as the release of the roller 61 permits the upper clamping means 21, which is now in an inverted position, to open under the action of gravity, it will move to a position as shown in FIG. 2 wherein it will be held against the limiting stop by the action of spring 59. The brake shoe with the lining pad bonded thereto is now free to be discharged under its own weight from the clamping means 20 and be delivered under the action of gravity to a collection point below the apparatus.

As each transporting device A leaves the second path section in its path of travel, it will be carried in open non-clamping position to the beginning of the first path section, and as the beginning of the first path is approached and the transporting device continues around the left end of the apparatus as viewed in FIG. 1, the roller 61 will engage a curved section 78c of the camming track, this section having such configuration as to cam the upper clamping means 21 from its opened to closed position with a relatively slow controlled movement. During this interval in which the clamping means are being closed, the operator will have ample time to recharge the transporting device with another brake shoe and lining pad to be bonded thereon.

From the foregoing description and drawings, it will be clearly evident that the delineated objects of the invention will be accomplished and that the various features of the invention will be obtained.

Various modifications may suggest themselves to those skilled in the art without departing from the spirit of my invention, and, hence, I do not wish to be restricted to the specific form shown or uses mentioned, except to the extent indicated in the appended claims.

I claim:

1. Apparatus for bonding a brake lining pad to an arcuate brake shoe having a mounting flange, comprising:
   (a) means including a pair of clamping members for pressing a brake lining pad surface having a bonding medium thereon against an outer surface of the arcuate brake shoe to which it is to be bonded, one of said clamping members having an opening for receiving the mounting flange of said brake shoe;
   (b) elements respectively supported on opposite sides of said one of said clamping members for movement into and out of engagement with the sides of said pad, and in engagement operating to laterally align the pad on the brake shoe;
   (c) means normally urging said elements out of engagement with the pad;
   (d) electro-magnetic means positioned between said elements and being energizable to move said elements into engagement with the pad; and (e) means for heating said brake shoe adjacent said outer surface to activate said bonding medium.

2. An apparatus for bonding a brake lining pad to an arcuate brake shoe having a mounting flange:
  (a) a frame structure;
  (b) a longitudinally arcuate first clamping member carried by said frame structure for supporting the brake shoe in an upright position with the mounting flange extending downwardly, said member having a slot for receiving the mounting flange of the brake shoe;
  (c) a second clamping member having a rigid frame hinged at one end on said frame structure for swinging movement to clamping and non-clamping relation with respect to the first clamping member, and in clamping position acting to press a brake lining pad surface having a bonding medium thereon against a surface of the brake shoe to which it is to be bonded;
  (d) means at the other end of said second clamping member for resiliently retaining the clamping members in clamping relation; and
  (e) energizable heating means carried by said first clamping member for heating said brake shoe surface to which the pad is to be bonded to activate said bonding medium.

3. Apparatus according to claim 2, wherein the hinged end of said second clamping member is resiliently supported.

4. Apparatus according to claim 2, wherein the rigid frame of the second clamping member is arcuate, and carries a flexible band between its ends for engagement with the brake lining.

5. In apparatus for bonding a brake lining pad to an arcuate brake shoe having a mounting flange:
  (a) a frame structure movably supported as a unit and including means for guiding it along a predetermined path of movement;
  (b) a longitudinally arcuate first clamping member carried by said frame structure for supporting the brake shoe in an upright position, said member having a slot for receiving the mounting flange of the brake shoe;
  (c) a second clamping member having a rigid frame hinged at one end on said frame structure for swinging movement to clamping and non-clamping relation with respect to the first clamping member, and in clamping position acting to press a brake lining pad surface having a bonding medium thereon against a surface of the brake shoe to which it is to be bonded;
  (d) means engageable with the other end of said second clamping member for releasably retaining the clamping members in clamping relation; and
  (e) means for heating said brake shoe adjacent the brake shoe surface to which the pad is to be bonded to activate said bonding medium, said heating means comprising an electrically energizable heating element having slide terminal contacts for slidably maintaining the heating element connected with an electrical source during guided movement of the frame structure.

6. Apparatus for bonding a brake lining pad to a brake shoe, comprising:
  (a) means for progressively moving a brake shoe and an underlying heating element as a unit through a succession of operative stations;
  (b) means at one station for pressing a brake lining pad surface having a bonding medium thereon against a surface of the brake shoe to which it is to be bonded;
  (c) means at a next station for energizing said heating element for heating the brake shoe and bonding medium while the lining pad is being pressed against the brake shoe; and
  (d) means at following stations for deenergizing said heating element and for releasing the pressing means and discharging the brake shoe with the bonded lining pad thereon.

7. Apparatus for bonding a brake lining pad to a brake shoe, comprising:
  (a) means for progressively moving a brake shoe and underlying energizable heating means as a unit through a succession of operative stations;
  (b) means at a first station for pressing a brake lining pad surface having a bonding medium thereon against a surface of the brake shoe to which it is to be bonded;
  (c) means at a second station for energizing said heating means for a predetermined interval for heating the brake shoe and bonding medium while the lining pad is being pressed against the brake shoe;
  (d) means at a third station for cooling the brake shoe and lining pad bonded thereto; and
  (e) means at a fourth station for releasing the pressing means and discharging the brake shoe with the bonded lining pad thereon.

8. Apparatus for bonding a brake lining pad to a brake shoe surface, comprising:
  (a) transporting means including a pair of clamping members supported for movement to opened and closed positions, and in the closed position being operative to press an inserted brake lining pad surface having a bonding medium thereon against a surface of an associated brake shoe to which it is to be bonded;
  (b) means for moving the transporting device along a path having a first section in which the transporting means are in an upright position, and a second section in which the transporting means are in an inverted postion;
  (c) means for closing said clamping members with a lining pad and brake shoe therein when the transporting means are in the first section of said path;
  (d) means for applying heat energy to the brake shoe while the clamping members are closed to heat and activate the bonding medium; and
  (e) means for opening said clamping members when the transporting means are in said second path section for gravitationally discharging and delivering the brake shoe with the bonded lining pad thereon to a point of collection.

9. Apparatus according to claim 8, wherein the heat energy is applied while the transporting means are in the first path section.

10. Apparatus for bonding a brake lining pad to a brake shoe surface, comprising:
  (a) transporting means including a pair of clamping members supported for movement to opened and closed positions, and in the closed position being operative to press an inserted brake lining pad surface having a bonding medium thereon against a surface of an associated brake shoe to which it is to be bonded;
  (b) means for moving the transporting device along a path having a first section in which the transporting means are in an upright position, and a second section in which the transporting means are in an inverted position;
  (c) means for closing said clamping members with a lining pad and brake shoe therein when the transporting means are in the first section of said path;
  (d) means for applying heat energy to the brake shoe while the clamping members are closed to heat and activate the bonding medium;
  (e) means for opening said clamping members when the transporting means are in said second path section for gravitationally discharging and delivering the brake shoe with the bonded lining pad thereon to a point of collection; and (f) means for cooling the brake shoe and lining pad bonded thereto subsequent to heating and while the clamping members are in closed position.

11. Apparatus according to claim 10, wherein the cooling occurs when the transporting means are in the second path section.

References Cited
UNITED STATES PATENTS

| | | | |
|---|---|---|---|
| 2,675,850 | 4/1954 | Kasak. | |
| 2,305,010 | 12/1942 | Kenney et al. | 100—93 |
| 2,416,427 | 2/1947 | Bonawit et al. | 100—93 X |
| 2,489,496 | 11/1949 | O'Brien | 100—93 |
| 2,569,737 | 10/1951 | Spanich | 100—93 |
| 2,598,363 | 5/1952 | Davis | 100—93 |
| 2,616,480 | 11/1952 | Barrett | 100—93 |
| 2,653,644 | 9/1953 | Overman et al. | 100—93 |
| 2,655,974 | 10/1953 | Heintz | 100—93 |
| 2,726,974 | 12/1955 | Lupton et al. | 100—93 |
| 3,014,520 | 12/1961 | Myers | 100—222 X |

PETER FELDMAN, *Primary Examiner.*

U.S. Cl. X.R.

156—583